United States Patent [19]

Morimitsu et al.

[11] Patent Number: 5,037,965
[45] Date of Patent: Aug. 6, 1991

[54] MONOAZO RED DYE COMPOUND HAVING VINYLSULFONE TYPE FIBER REACTIVE GROUPS

[75] Inventors: Toshihiko Morimitsu, Minoo; Kingo Akahori, Toyonaka; Yutaka Kayane, Ibaraki; Naoki Harada, Suita; Takashi Omura, Kobe, all of Japan

[73] Assignee: Sumitomo Chemical Company, Limited, Osaka, Japan

[21] Appl. No.: 273,828

[22] Filed: Nov. 21, 1988

[30] Foreign Application Priority Data

Dec. 1, 1987 [JP] Japan .................. 62-304790
Jan. 20, 1988 [JP] Japan .................. 63-011688

[51] Int. Cl.$^5$ .............. C09B 62/085; C09B 62/51; D06P 1/382; D06P 1/384
[52] U.S. Cl. ............. 534/612; 534/605; 534/632; 534/638; 534/642; 534/887
[58] Field of Search ........... 534/617, 632, 638, 642, 534/644, 605, 612

[56] References Cited

U.S. PATENT DOCUMENTS

| | | | |
|---|---|---|---|
| 4,378,312 | 3/1983 | Hoyer et al. | 534/617 X |
| 4,626,589 | 12/1986 | Omura et al. | 534/642 X |
| 4,757,136 | 7/1988 | Springer et al. | 534/632 X |
| 4,812,558 | 3/1989 | Omura et al. | 534/642 X |

FOREIGN PATENT DOCUMENTS

| | | | |
|---|---|---|---|
| 0239847 | 10/1987 | European Pat. Off. | 534/638 |
| 3217812 | 11/1983 | Fed. Rep. of Germany | 534/642 |
| 3514969 | 11/1986 | Fed. Rep. of Germany | 534/605 |
| 60-173061 | 9/1985 | Japan | 534/635 |
| 61-47887 | 3/1986 | Japan | 534/605 |
| 63-211378 | 9/1988 | Japan | 534/617 |
| 946998 | 1/1964 | United Kingdom | 534/605 |

OTHER PUBLICATIONS

Morimitsu et al. II, Chemical Abstracts, vol. 107, No. 200383s (1987).

*Primary Examiner*—Robert W. Ramsuer
*Assistant Examiner*—Fiona T. Powers
*Attorney, Agent, or Firm*—Stevens, Davis, Miller & Mosher

[57] ABSTRACT

A monoazo compound represented by the following formula in the free acid form,

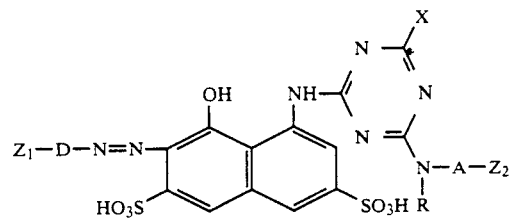

wherein D is phenylene or naphthylene, R is hydrogen or alkyl, A is phenylene or naphthylene, $Z_1$ and $Z_2$ independently of one another are each vinylsulfonyl, β-sulfatoethylsulfonyl and the like, and X is pyridinio or amino represented by the following formula

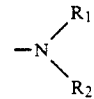

wherein $R_1$ and $R_2$ independently of one another are each hydrogen, alkyl, phenyl, naphthyl or benzyl, which is useful for dyeing or printing fiber materials to give dyed or printed products of red color excellent in fastness properties with excellent build-up, level-dyeing and washing-off properties.

14 Claims, No Drawings

MONOAZO RED DYE COMPOUND HAVING VINYLSULFONE TYPE FIBER REACTIVE GROUPS

The present invention relates to a monoazo compound, a process for producing the same and a process for dyeing fiber materials using the same. More specifically, the present invention relates to a monoazo compound having plural vinylsulfone type fiber reactive groups through an amino- or pyridinio-substituted triazinyl group, which is particularly useful for dyeing or printing fiber materials in a red color.

Reactive dyes, having a vinylsulfone type fiber reactive group have been extensively used for dyeing fiber materials, particularly those such as cellulose fibers. However, these known dyes are not yet sufficient to meet needs of high level for dye performances in a certain dyeing method such as exhaustion dyeing, and for fastness properties of dyed products.

Many kinds of reactive dyes useful for dyeing or printing fiber materials in a red color are known. For example, U.S. Pat. No. 3,223,470 discloses a red reactive dye represented by the following formula in the free acid form,

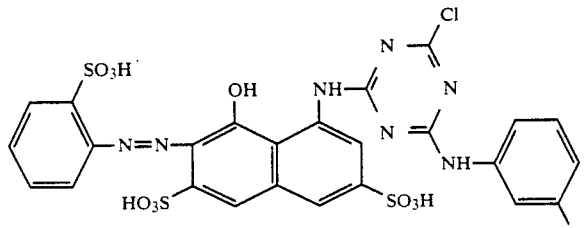

and Published Unexamined Japanese Patent Application No. 59-115362 also discloses a reactive red dye represented by the following formula in the free acid form,

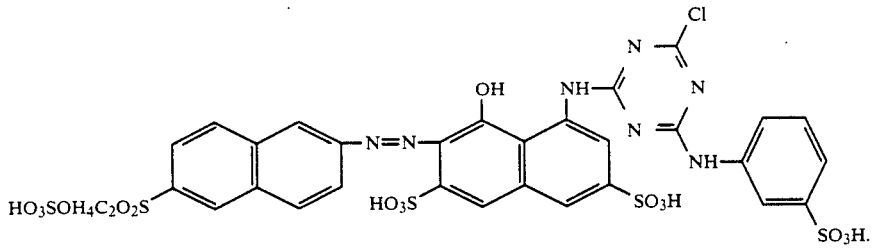

However, these known red dyes also are not yet sufficient in their solubility, dye performances such as build-up property and the like, and fastness properties such as acid-hydrolysis fastness, chlorine fastness and the like, and are awaiting for improvements.

It is natural that the solubility is a significant property required for the reactive dye on carrying out the dyeing or printing of fiber materials without any difficulty, as already known, for example, from "The dictionary of dyes and dyeing", edited by K. G. Ponting, page 159 (1980). Moreover, dyeing and printing systems in a dye house have been activity mechanized and automated in many aspects for saving energy and labor, and therefore the reactive dyes have been eagerly required to be formed into an aqueous liquid composition for automatic weighing and dispensing systems. Also for this reason, the solubility of the reactive dye is significant.

Generally speaking, a reactive dye having a high solubility decreases its affinity to fibers, and is easy to hydrolyze its fiber reactive group, resulting in decrease of its build-up property.

Therefore, it is considered that the solubility of the reactive dye can be improved with detriment to the build-up property and vice versa.

The build-up property is significant from economical point of view, and therefore now strongly desired to be improved.

In order to meet needs of high level for fastness properties of the dyed products, it is required to make a molecular structure of the dye and a bonding strength between the dye and fibers stable under certain conditions of dyeing procedures and after treatments and using conditions of the dyed products.

The present inventors have undertaken extensive studies to improve the defects of the above known reactive dyes and to find reactive dyes of a red color meeting various needs of high level including those described above, and as a result have found a specific monoazo compound.

The present invention provides a monoazo compound represented by the following formula (I) in the free acid form,

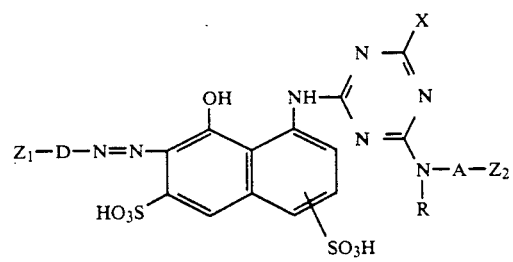

(I)

wherein D is unsubstituted or substituted phenylene or naphthylene, R is hydrogen or unsubstituted or substituted alkyl, A is unsubstituted or substituted phenylene or naphthylene, $Z_1$ and $Z_2$ independently of one another are each $-SO_2CH=CH_2$ or $-SO_2CH_2CH_2Y$ in which Y is a group splittable by the action of an alkali, and X is unsubstituted or substituted pyridinio or amino of the following formula (II),

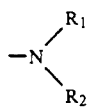
(II)

in which $R_1$ and $R_2$ independently of one another are each hydrogen or unsubstituted or substituted alkyl, phenyl, naphthyl or benzyl, provided that when any one of $R_1$ and $R_2$ is hydrogen and the other is phenyl, the phenyl is one member selected from phenyl and mono- or di-sulfophenyl which are unsubstituted or substituted by a substituent in which the atom attached to the carbon atom of the phenyl is one other than oxygen, sulfur and nitrogen, with the proviso that $Z_1$ is located at m- or p-position to the azo group when D is phenylene.

The present invention further provides a process for producing the monoazo compound of the above formula (I), which comprises (1) reacting a monoazo intermediate compound represented by the following formula (VII) in the free acid form,

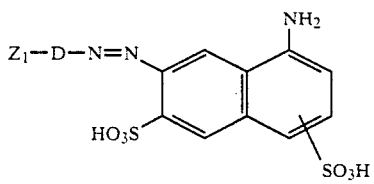
(VII)

wherein D and $Z_1$ are as defined above, an aromatic amine compound represented by the following formula (VIII).

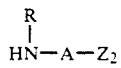
(VIII)

wherein R, A and $Z_2$ are as defined above, and any one of an amine compound represented by the following formula (IX),

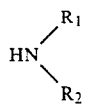
(IX)

wherein $R_1$ and $R_2$ are as defined above, or a pyridine compound represented by the following formula (X),

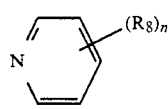
(X)

wherein $R_8$ is hydrogen, carboxy, carbamoyl, sulfo, halogeno or unsubstituted or substituted alkyl, with a cyanuric halide in an optional order to obtain the monoazo compound of the formula (I), or (2) reacting the aromatic amine compound of the formula (VIII) any one of the amine compound of the formula (IX) or the pyridine compound of the formula (X), and a naphthalenedisulfonic acid of the following formula (XI) in the free acid form,

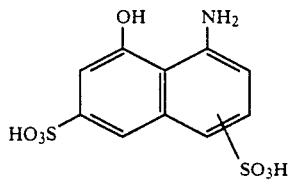
(XI)

with a cyanuric halide in an optional order, followed by coupling with a diazonium salt of another aromatic amine compound of the following formula (XII), $Z_1-D-NH_2$ (XII)

wherein $Z_1$ and D are as defined above, to obtain the monoazo compound of the formula (I).

The present invention furthermore provides a process for dyeing or printing fiber materials, which comprises using the monoazo compound of the formula (I).

In the present invention, the phenylene represented by D in the above formula (I) may be unsubstituted or substituted once, twice or three times by methyl, ethyl, methoxy, ethoxy, halogeno, acetylamino, propionylamino, nitro, sulfo, carboxy, vinylsulfonyl or β-sulfatoethylsulfonyl. Of these, preferred are those substituted twice or less. Particularly preferred is sulfophenylene from viewpoint of dye performances.

The naphthylene represented by D may be unsubstituted or substituted once or twice by sulfo, vinylsulfonyl or β-sulfatoethylsulfonyl. Of these, preferred are those once substituted. Particularly preferred is sulfonaphthylene from viewpoint of dye performances.

Among those represented by D, particularly preferred are those represented by the following formulas,

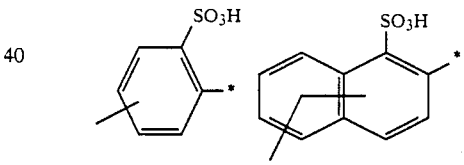

wherein the linkage asterisked bonds to the azo group.

The alkyl represented by R is preferably one having 1 to 4 carbon atoms, and may be unsubstituted or substituted by hydroxy, cyano, alkoxy having 1 to 4 carbon atoms, halogeno, carboxy, carbamoyl, $C_1$–$C_4$ alkoxycarbonyl, $C_1$–$C_4$ alkylcarbonyloxy, sulfo or sulfamoyl. Examples of the alkyl are methyl, ethyl, n-propyl, isopropyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypyropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like.

Among those represented by R, preferred are hydrogen, methyl and ethyl.

The phenylene represented by A may be unsubstituted or substituted once or twice by methyl, ethyl, methoxy, ethoxy, chloro, bromo or sulfo, and the naphthylene represented by A may be unsubstituted or substituted by sulfo. Preferred examples thereof are as follows:

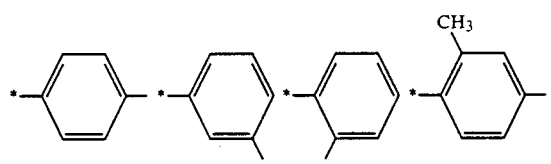

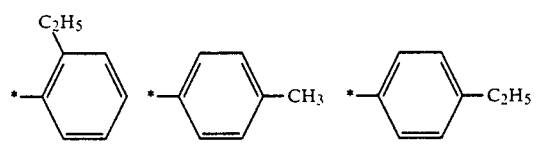

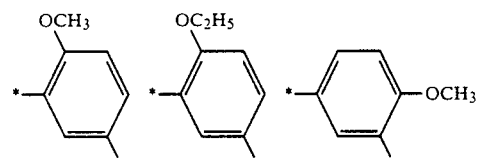

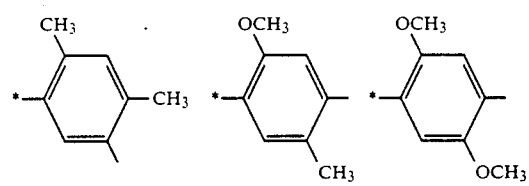

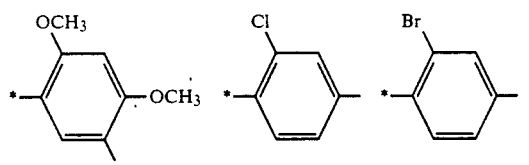

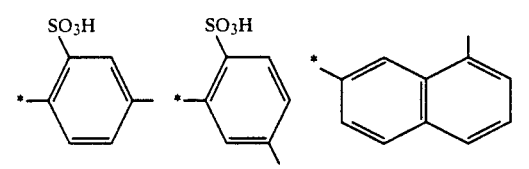

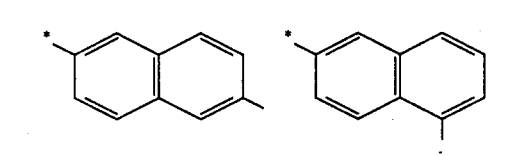

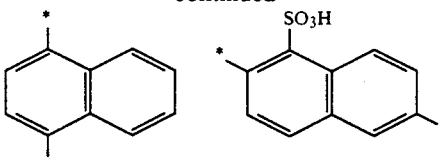

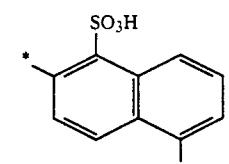

In the above formulas, the linkage asterisked bonds to the group of $$-\underset{\underset{\displaystyle |}{\displaystyle N}}{\overset{\displaystyle R}{}}-.$$

The group Y splittable by the action of an alkali in —SO₂CH₂CH₂Y represented by $Z_1$ and $Z_2$ includes, for example, OSO₃H, OPO₃H, OCOCH₃, SOO₃H, Cl and the like. Among those represented by $Z_1$ and $Z_2$, preferred are —SO₂CH₂CH₂OSO₃H and —SO₂CH=CH₂.

When X is the amino represented by the formula (II), the alkyl represented by $R_1$ and $R_2$ is preferably one having 1 to 4 carbon atoms, and may be unsubstituted or substituted once or twice by alkoxy having 1 to 4 carbon atoms, sulfo, carboxy, hydroxy, chloro, phenyl or sulfato. Among those, preferred are methyl, ethyl, n-propyl, iso-propyl, n-butyl, iso-butyl, sec-butyl, β-hydroxyethyl, β-sulfatoethyl, β-sulfoethyl, β-methoxyethyl, β-carboxyethyl and the like.

The phenyl represented by $R_1$ and $R_2$ may be unsubstituted or substituted once or twice by alkyl having 1 to 4 carbon atoms, sulfo, carboxy or chloro. Of these, particularly preferred are phenyl, 2-, 3- or 4-sulfophenyl, 2-, 3- or 4-carboxyphenyl, 2-, 3- or 4-chlorophenyl, 3,4-, 3,5- or 3,6-disulfophenyl, 2-, 3- or 4-methylphenyl and the like.

The naphthyl represented by $R_1$ and $R_2$ may be unsubstituted or substituted once, twice or three times by hydroxy, carboxy, sulfo, alkyl having 1 to 4 carbon atoms, alkoxy having 1 to 4 carbon atoms or chloro. Of these, particularly preferred are 2-, 3-, 4-, 5-, 6-, 7- or 8-sulfo-1-naphthyl, 1-, 5-, 6-, 7- or 8-sulfo-2-naphthyl, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl and the like.

The benzyl represented by $R_1$ and $R_2$ may be unsubstituted or substituted once or twice by alkyl having 1 to 4 carbon atoms, alkoxy having 1 to 4 carbon atoms, sulfo or chloro. Of these, particularly preferred are benzyl, 2-, 3- or 4-sulfobenzyl.

In the present invention, preferred is a case where any one of $R_1$ and $R_2$ is methyl or ethyl, and the other is phenyl unsubstituted or substituted by alkyl having 1 to 4 carbon atoms, alkoxy having 1 to 4 carbon atoms, sulfo, carboxy or halogeno, and any one of $R_1$ and $R_2$ is hydrogen, and the other is phenyl or mono- or di-sulfophenyl unsubstituted or substituted by a substituent in which the atom attached to the carbon atom of the phenyl is one other than oxygen, sulfur and nitrogen.

Such substituent includes, for example, alkyl having 1 to 4 carbon atoms, carboxy and halogeno.

When X is pyridinio, the pyridinio may be unsubstituted or substituted by carboxy, carbamoyl, sulfo, halogeno or unsubstituted or substituted alkyl having 1 to 4 carbon atoms, such as β-hydroxyethyl, β-sulfoethyl and the like. Of these, preferred are carboxypyridinio and carbamoylpyridinio. Particularly preferred from viewpoint of dye performances is carboxypyridinio.

The monoazo compound represented by the formula (I) may be in the form of free acid or preferably in the form of alkali metal or alkaline earth metal salt such as sodium salt, potassium salt and the like.

Among the monoazo compounds of the formula (I), preferred is one represented by the following formula (XIII) in the free acid form,

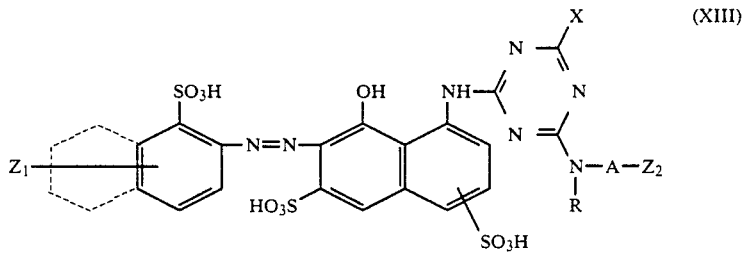

wherein R, A, X, $Z_1$ and $Z_2$ are as defined above.

Of these, particularly preferred are those represented by the following formulas (IV), (V) and (VI) in their free acid form, the formula (IV) being

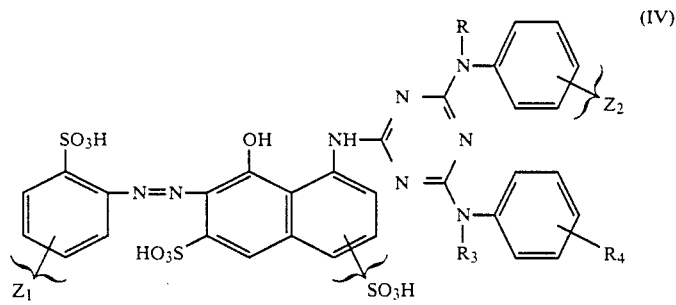

wherein R, $Z_1$ and $Z_2$ are as defined above, $R_3$ is hydrogen, methyl or ethyl, and $R_4$ is hydrogen, methyl, ethyl, sulfo or chloro, the formula (V) being

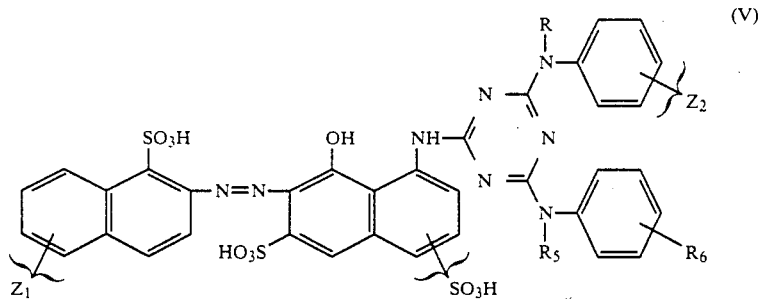

wherein R, $Z_1$ and $Z_2$ are as defined above, $R_5$ is hydrogen, methyl or ethyl, and $R_6$ is hydrogen, methyl, ethyl, sulfo or chloro, and the formula (VI) being

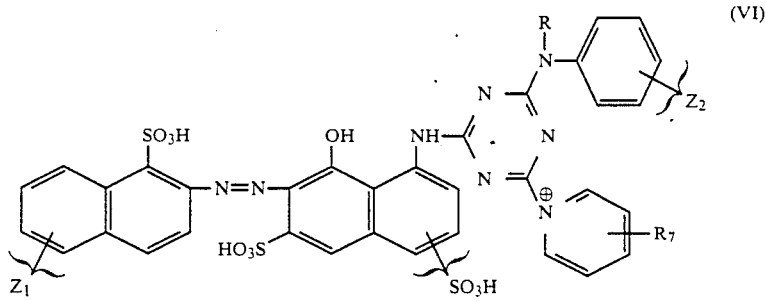

wherein R, $Z_1$ and $Z_2$ are as defined above, and $R_7$ is hydrogen, carboxy or carbamoyl.

The monoazo compound of the formula (I) can be produced in a manner exemplified as follows.

Any one of the monoazo intermediate compound of the formula (VII) or the aromatic amine compound of the formula (VIII) is subjected to first condensation with a cyanuric halide such as cyanuric chloride and cyanuric fluoride, followed by second condensation using the remaining one, thereby obtaining the corresponding monohalogenotriazine compound.

The first and second condensations can be carried out in an aqueous medium at a temperature of $-10°$ to $50°$ C., preferably $0°$ to $30°$ C., while controlling the pH within a range of 1 to 10, preferably 2 to 7, and at a temperature of $0°$ to $70°$ C., preferably $10°$ to $50°$ C., while controlling the pH within a range of 2 to 9, preferably 3 to 6, respectively.

Successively, the monohalogenotriazine compound is subjected to third condensation with the amine compound of the formula (IX) or the pyridine compound of the formula (X).

The third condensation can be carried out in an aqueous medium at a temperature of $50°$ to $100°$ C., preferably $70°$ to $100°$ C., while controlling the pH within a range of 2 to 9, preferably 3 to 7, whereby the desired monoazo compound of the formula (I) can be produced.

Alternatively, the amine compound (IX) or the pyridine compound (X) can be subjected to first condensation with the cyanuric halide, followed by second and third condensations using the monoazo intermediate compound (VII) and the aromatic amine compound (VIII) in an optional order. In this case, the first condensation can be carried out in an aqueous medium at a temperature of $-10°$ to $50°$ C., preferably $0°$ to $30°$ C., while controlling the pH within a range of 1 to 10, preferably 2 to 7, the second condensation at a temperature of $0°$ to $70°$ C., preferably $10°$ to $50°$ C., while controlling the pH within a range of 2 to 9, preferably 3 to 6, and the third condensation at a temperature of $50°$ to $100°$ C., preferably $50°$ to $80°$ C., while controlling the pH within a range of 2 to 9, preferably 3 to 7.

In another manner, the naphthalenedisulfonic acid of the formula (XI), namely H acid or K acid, and the aromatic amine compound of the formula (VIII), and the amine compound of the formula (IX) or the pyridine compound of the formula (X) can be subjected to condensation with the cyanuric halide in an optional order, followed by coupling with a diazonium salt of another aromatic amine compound of the formula (XII), whereby the desired monoazo compound (I) can be also produced.

In the above manners, the order of the condensation is not particularly limited. However, considering the reaction yield and quality of the desired monoazo compound of the formula (I), it is favorable to use any one lower in the reactivity to the cyanuric halide in an earlier stage.

The amine compound (IX) usable in the present invention includes, for example, ammonia, aromatic amines and aliphatic amines. Examples of the aromatic amines are 1-aminobenzene, 1-amino-2-, 3- or 4-methylbenzene, 1-amino-3,4- or 3,5-dimethylbenzene, 1-amino-2-, 3- or 4-ethylbenzene, 1-amino-2-, 3- or 4-chlorobenzene, 3- or 4-amino-phenylmethane sulfonic acid, 3-aminobenzenesulfonic acid, 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,4disulfonic acid, 4-aminobenzene-1,2-disulfonic acid, 4-aminobenzene-1,2-disulfonic acid, 4-amino-5-methylbenzene-1,2-disulfonic acid, 2-, 3- or 4-aminobenzoic acid, 5-aminobenzene-1,3-dicarboxylic acid, N-methylaminobenzene, N-ethylaminobenzene, 1-methylamino-3- or 4-methylbenzene, 1-ethylamino-4-chlorobenzene, 1-ethylamino-3- or 4-methylbenzene, 1-(2-hydroxyethyl)amino-3-methylbenzene, 3- or 4-methylaminobenzoic acid, 3- or 4-methylaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 4-aminonaphthalene-2-sulfonic acid, 5-aminonaphthalene-2sulfonic acid, 6-aminonaphthalene-2-sulfonic acid, 7-aminonaphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutylaminonaphthalene-2-sulfonic acid, 8-aminonaphthalene-2-sulfonic acid, 4-aminonaphthalene-1,3disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid, 4-aminonaphthalene-1,3,7-trisulfonic acid and the like.

Examples of the aliphatic amines are methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis-(2-hydroxyethyl)-amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, $\epsilon$-aminocaproic acid, benzylamine, 2-, 3- or 4-chlorobenzylamine, 4-methylbenzylamine, N-methylbenzylamine, 2-, 3- or 4-sulfobenzylamine, 2-phenylethylamine, 1-phenylethylamine, 1-phenyl-2-propylamine and the like.

Of these, preferred examples are aniline, N-methylaniline, N-ethylaniline, 2-, 3- or 4-chloroaniline, N-methyl-2-, 3- or 4-chloroaniline, N-ethyl-2-, 3- or 4-chloroaniline, 2-, 3- or 4-methylaniline, 3- or 4-methylaminobenzenesulfonic acid, 3- or 4-ethylaminobenzenesulfonic acid, taurine, N-methyltaurine, mono- or di-ethanolamine and the like.

Examples of the pyridine compound (X) usable in the present invention are pyridine, 2-, 3- or 4-carboxypyridine, 2-, 3- or 4-carbamoylpyridine, 3-sulfopyridine, 4-$\beta$-sulfoethylpyridine, 3-$\beta$-hydroxyethylpyridine, 4-chloropyridine, 3-methylpyridine, 3,5-dicarboxypyridine and the like. Of these, particularly preferred are 3- or 4-carboxypyridine (nicotinic acid, isonicotinic acid) and the like.

After completion of the reactions, the desired monoazo compound-containing reaction mixture may be subjected to salting-out in a conventional manner, demineralization with a semipermeable membrane, evaporation such as spray-drying or the like, if desired, with use of usual auxiliary agents such as stabilizing agents, dyeing improvers and the like, to provide a pulverulent or liquid commercial product.

The monoazo compound of the present invention is fiber-reactive and useful for dyeing or printing hydroxyl group-containing and amide group-containing mateials. The materials are favorably in a fibrous form.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the monoazo compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, together with a hydrotropic agent, a penetrant or a level dyeing agent. The neutral salt suitable for promoting the exhaustion may be added to a dye bath before or after temperature reaching a desired level for the dyeing, if desired, dividedly.

The padding can be carried out by padding the fiber materials at ambinet temperature or an elevated temperature, and after drying, steaming or dry-heating the materials to perform the dye-fixation.

The cold batch-up dyeing can be carried out by padding the fiber materials with a padding liquor at ambient temperature, batching up and allowing them to stand on a roller for 3 hours or more or over night, followed by washing with water and drying.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzenesulfonic acid or aminonaphthalenesulfonic acid, or an addition product between stearylamine and ethylene oxide, and the like.

The present monoazo compound can be characterized by excellent dye performance in the dyeing and printing of fiber materials, particularly cellulose fiber materials. For example, the compound can give a dyed product excellent in light fastness, perspiration-light fastness, formalin fastness, wet fastness such as washing resistance, peroxide-washing resistance, chlorine resistance, chlorine bleaching resistance, perspiration resistance and acid-hydrolysis resistance, and alkali fastness, abrasion fastness and iron fastness. The monoazo compound can also exhibit extremely excellent build-up, level-dyeing and washing-off properties and high solubility as well as high exhaustion and fixation percentages. Moreover, when used for the dyeing or printing, the monoazo compound can hardly be affected by changes in dyebath conditions such as temperatures, pH, amounts of inorganic salts and bath ratio, so that a dyed or printed product with a constant quality can be obtained with superior reproducibility.

Further, particularly when applied for the dyeing by the cold batch-up dyeing method, the monoazo compound can exhibit excellent build-up property and alkali stability (almost no hydrolysis by the action of the alkali agent) and almost no difference in the depth and shade appears between the dyed products obtained by fixing at 25° C. and at a lower temperature than that.

The present invention is illustrated in more detail with reference to the following Examples, which are only illustrative, but not limitative. In Examples, all parts and % are by weight.

EXAMPLE 1

1-Amino-8-naphthol-3,6-disulfonic acid (319.3 parts) was subjected to first condensation with cyanuric chloride (184.5 parts), followed by second condensation with 1-aminobenzene-3-$\beta$-sulfatoethylsulfone (281.3 parts), thereby obtaining a monochlorotriazinyl compound represented by the following formula in the free acid form.

densation with aniline (93.1 parts). The reaction mixture was mixed with sodium chloride to precipitate crystals, which were separated on a filter. Thus, there was obtained a monoazo compound represented by the following formula in the free acid form.

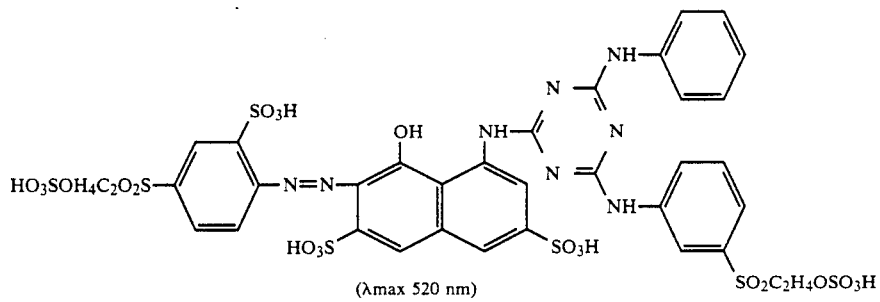

($\lambda$max 520 nm)

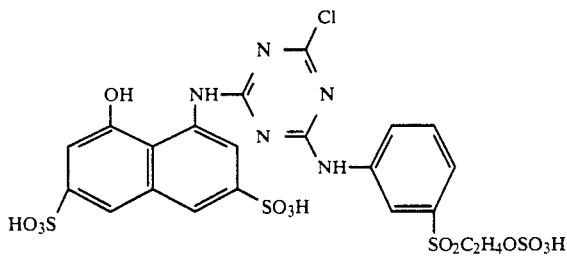

On the other hand, 1-amino-2-sulfobenzene-4-$\beta$-sulfatoethylsulfone (361.3 parts) was diazotized in a conventional manner, and the resulting diazonium compound was subjected to coupling with the monochlorotriazinyl compound obtained above, followed by con-

EXAMPLE 2

Example 1 was repeated, provided that the following diazo component, coupler, amine and reactive component shown in the 2nd, 3rd, 4th and 5th columns of the following Table I, respectively, were used in place of 1-amino-2-sulfobenzene-4-$\beta$-sulfatoethylsulfone, 1-amino-8-naphthol-3,6-disulfonic acid, aniline and 1-aminobenzene-3-$\beta$-sulfatoethylsulfone used in Example 1, respectively, thereby obtaining the corresponding monoazo compound, which showed each color shown in 6th column of the following Table I on the dyeing of cellulose fiber materials.

TABLE I

| 1 Run No. | 2 Diazo component | 3 Coupler | 4 Amine | 5 Reactive component | 6 Color |
|---|---|---|---|---|---|
| 1 | 1-Amino-2-sulfo-benzene-4-$\beta$-sulfatoethyl-sulfone | 1-Amino-8-naphthol-3,6-disulfonic acid | Aniline | 1-Aminobenzene-3-vinylsulfone | Red |
| 2 | 1-Amino-2-sulfo-benzene-4-$\beta$-sulfatoethyl-sulfone | 1-Amino-8-naphthol-3,6-disulfonic acid | Aniline | 1-Aminobenzene-4-$\beta$-sulfatoethyl-sulfone | Red |
| 3 | 1-Amino-2-sulfo-benzene-4-$\beta$-sulfatoethyl-sulfone | 1-Amino-8-naphthol-3,6-disulfonic acid | N-Ethylaniline | 1-Aminobenzene-4-$\beta$-sulfatoethyl-sulfone | Red |
| 4 | 1-Amino-2-sulfo-benzene-4-$\beta$-sulfatoethyl-sulfone | 1-Amino-8-naphthol-3,6-disulfonic acid | N-Ethyl-p-chloroaniline | 1-Aminobenzene-3-$\beta$-sulfatoethyl-sulfone | Red |
| 5 | 1-Amino-2-sulfo-benzene-4-$\beta$-sulfatoethyl-sulfone | 1-Amino-8-naphthol-3,6-disulfonic acid | p-Chloroaniline | 1-Aminobenzene-3-$\beta$-sulfatoethyl-sulfone | Red |
| 6 | 1-Amino-2-sulfo-benzene-4-$\beta$-sulfatoethyl-sulfone | 1-Amino-8-naphthol-3,6-disulfonic acid | Taurine | 2-Aminonaphtha-lene-6-$\beta$-sulfato-ethylsulfone-1-sulfonic acid | Red |
| 7 | 1-Amino-2-sulfo-benzene-4-$\beta$-sulfatoethyl-sulfone | 1-Amino-8-naphthol-3,6-disulfonic acid | $\beta$-Hydroxyethyl-amine | 1-Ethylamino-benzene-4-$\beta$-sulfatoethyl-sulfone | Red |
| 8 | 1-Amino-2-sulfo-benzene-4-$\beta$-sulfatoethyl-sulfone | 1-Amino-8-naphthol-3,6-disulfonic acid | 2-Aminonaphtha-lene-6-sulfonic acid | 1-Amino-2-sulfo-benzene-4-$\beta$-sulfatoethyl-sulfone | Red |
| 9 | 1-Amino-2-sulfo-benzene-4-$\beta$-sulfatoethyl-sulfone | 1-Amino-8-naphthol-3,6-disulfonic acid | Benzylamine | 1-Amino-2-sulfo-benzene-4-$\beta$-sulfatoethyl-sulfone | Red |
| 10 | 1-Amino-2-sulfo-benzene-4-$\beta$- | 1-Amino-8-naphthol-3,6- | N-Ethylaniline 3-sulfonic acid | 2-Aminonaphtha-lene-8-$\beta$-sulfato- | Red |

TABLE I-continued

| Run No. | Diazo component | Coupler | Amine | Reactive component | Color |
|---|---|---|---|---|---|
| | sulfatoethyl-sulfone | disulfonic acid | | ethylsulfone-6-sulfonic acid | |
| 11 | 1-Amino-2-sulfobenzene-4-β-sulfatoethylsulfone | 1-Amino-8-naphthol-4,6-disulfonic acid | N-Methylaniline | 2-Aminonaphthalene-5-β-sulfatoethylsulfone-1-sulfonic acid | Yellowish red |
| 12 | 1-Amino-2-sulfobenzene-4-β-sulfatoethylsulfone | 1-Amino-8-naphthol-4,6-disulfonic acid | o-Methylaniline | 1-Amino-2-methoxybenzene-5-β-phosphatoethylsulfone | Yellowish red |
| 13 | 1-Amino-2-sulfobenzene-5-β-sulfatoethylsulfone | 1-Amino-8-naphthol-3,6-disulfonic acid | Aniline | 1-Aminobenzene-3-β-sulfatoethylsulfone | Yellowish red |
| 14 | 1-Amino-2-sulfobenzene-5-β-sulfatoethylsulfone | 1-Amino-8-naphthol-3,6-disulfonic acid | N-Ethylaniline | 2-Aminonaphthalene-6-β-sulfatoethylsulfone-1-sulfonic acid | Yellowish red |
| 15 | 2-Aminonaphtalene-5-β-sulfatoethylsulfone-1-sulfonic acid | 1-Amino-8-naphthol-3,6-disulfonic acid | N-Ethylaniline | 2-Aminonaphthalene-6-β-sulfatoethylsulfone-1-sulfonic acid | Bluish red |
| 16 | 2-Aminonaphtalene-5-β-sulfatoethylsulfone-1-sulfonic acid | 1-Amino-8-naphthol-3,6-disulfonic acid | N-Ethyl-p-chloroaniline | 1-Aminobenzene-3-β-sulfatoethylsulfone | Bluish red |
| 17 | 2-Aminonaphtalene-5-β-sulfatoethylsulfone-1-sulfonic acid | 1-Amino-8-naphthol-3,6-disulfonic acid | o-Chloroaniline | 1-Ethylaminobenzene-3-β-sulfatoethylsulfone | Bluish red |
| 18 | 2-Aminonaphtalene-5-β-sulfatoethylsulfone-1-sulfonic acid | 1-Amino-8-naphthol-3,6-disulfonic acid | N-Methyltauriue | 1-Amino-2-methoxy-5-methylbenzene-4-β-sulfatoethylsulfone | Bluish red |
| 19 | 2-Aminonaphthalene-6-β-sulfatoethylsulfone-1-sulfonic acid | 1-Amino-8-naphthol-3,6-disulfonic acid | Aniline | 1-Aminobenzene-3-β-sulfatoethylsulfone | Bluish red |
| 20 | 2-Aminonaphthalene-6-β-sulfatoethylsulfone-1-sulfonic acid | 1-Amino-8-naphthol-3,6-disulfonic acid | N-Methylaniline | 1-Aminobenzene-3-β-sulfatoethylsulfone | Bluish red |
| 21 | 2-Aminonaphthalene-6-β-sulfatoethylsulfone-1-sulfonic acid | 1-Amino-8-naphthol-3,6-disulfonic acid | N-Ethyl-p-chloroaniline | 2-Aminonaphthalene-6-β-sulfatoethylsulfone-1-sulfonic acid | Bluish red |
| 22 | 2-Aminonaphthalene-6-β-sulfatoethylsulfone-1-sulfonic acid | 1-Amino-8-naphthol-3,6-disulfonic acid | Taurine | 2-Aminonaphthalene-6-β-sulfatoethylsulfone-1-sulfonic acid | Bluish red |
| 23 | 2-Aminonaphthalene-6-β-sulfatoethylsulfone-1-sulfonic acid | 1-Amino-8-naphthol-3,6-disulfonic acid | Dihydroxyethylamine | 1-Amino-2-chlorobenzene-5-β-sulfatoethylsulfone | Bluish red |
| 24 | 2-Aminonaphthalene-6-β-sulfatoethylsulfone-1-sulfonic acid | 1-Amino-8-naphthol-4,6-disulfonic acid | Ethylamine | 1-Amino-2-ethoxybenzene-5-β-sulfatoethylsulfone | Red |
| 25 | 1-Aminobenzene 2,5-bis(β-sulfatoethylsulfone) | 1-Amino-8-naphthol-4,6-disulfonic acid | Ethylamine | 1-Amino-2-ethoxybenzene-5-β-sulfatoethylsulfone | Red |
| 26 | 2-Aminonaphthalene-5-β-sulfatoethylsulfone-1-sulfonic acid | 1-Amino-8-naphthol-3,6-disulfonic acid | Aniline | 1-N-Ethylaminobenzene-4-β-sulfatoethylsulfone | Bluish red |
| 27 | 2-Aminonaphthalene-5-β-sulfatoethylsulfone-1-sulfonic acid | 1-Amino-8-naphthol-3,6-disulfonic acid | N-Methylaniline | 1-Aminobenzene-4-β-sulfatoethylsulfone | Bluish red |

TABLE I-continued

| Run No. | Diazo component | Coupler | Amine | Reactive component | Color |
|---|---|---|---|---|---|
| 28 | 2-Aminonaphthalene-5-β-sulfatoethylsulfone-1-sulfonic acid | 1-Amino-8-naphthol-3,6-disulfonic acid | m-Sulfoaniline | 1-N-Ethylaminobenzene-3-β-sulfatoethylsulfone | Bluish red |
| 29 | 2-Aminonaphthalene-6-β-sulfatoethylsulfone-1-sulfonic acid | 1-Amino-8-naphthol-3,6-disulfonic acid | m-Sulfoaniline | 1-N-Ethylaminobenzene-4-β-sulfatoethylsulfone | Bluish red |
| 30 | 2-Aminonaphthalene-6-β-sulfatoethylsulfone-1-sulfonic acid | 1-Amino-8-naphthol-3,6-disulfonic acid | Aniline | 1-N-Ethylaminobenzene-4-β-sulfatoethylsulfone | Bluish red |
| 31 | 2-Aminonaphthalene-6-β-sulfatoethylsulfone-1-sulfonic acid | 1-Amino-8-naphthol-4,6-disulfonic acid | p-Methylaniline | 1-Aminobenzene-3-β-sulfatoethylsulfone | Red |
| 32 | 2-Aminonaphthalene-6-β-sulfatoethylsulfone-1-sulfonic acid | 1-Amino-8-naphthol-4,6-disulfonic acid | p-Methylaniline | 1-N-Ethylaminobenzene-3-β-sulfatoethylsulfone | Red |
| 33 | 2-Aminonaphthalene-6-β-sulfatoethylsulfone-1-sulfonic acid | 1-Amino-8-naphthol-4,6-disulfonic acid | p-Chloroaniline | 1-N-Ethylaminobenzene-4-β-sulfatoethylsulfone | Red |
| 34 | 2-Aminonaphthalene-6-β-sulfatoethylsulfone-1-sulfonic acid | 1-Amino-8-naphthol-4,6-disulfonic acid | N-Ethylaniline | 1-Aminobenzene-3-β-sulfatoethylsulfone | Red |
| 35 | 2-Aminonaphthalene-6-β-sulfatoethylsulfone-1-sulfonic acid | 1-Amino-8-naphthol-4,6-disulfonic acid | Aniline-3,5-disulfonic acid | 1-Aminobenzene-3-β-sulfatoethylsulfone | Red |
| 36 | 2-Aminonaphthalene-6-β-sulfatoethylsulfone-1-sulfonic acid | 1-Amino-8-naphthol-4,6-disulfonic acid | Aniline-4-sulfonic acid | 1-Aminobenzene-4-β-sulfatoethylsulfone | Red |
| 37 | 2-Aminonaphthalene-6-β-sulfatoethylsulfone-1-sulfonic acid | 1-Amino-8-naphthol-4,6-disulfonic acid | N-Methyl-p-toluidine | 1-Aminobenzene-4-β-sulfatoethylsulfone | Red |
| 38 | 2-Aminonaphthalene-6-β-sulfatoethylsulfone-1-sulfonic acid | 1-Amino-8-naphthol-3,6-disulfonic acid | N-Ethylaniline-4-carboxylic acid | 1-Aminobenzene-4-β-sulfatoethylsulfone | Bluish red |
| 39 | 2-Aminonaphthalene-6-β-sulfatoethylsulfone-1-sulfonic acid | 1-Amino-8-naphthol-3,6-disulfonic acid | Aniline-4-carboxylic acid | 1-N-β-Hydroxyethylaminobenzene-3-β-sulfatoethylsulfone | Bluish red |
| 40 | 2-Aminonaphthalene-5-β-sulfatoethylsulfone-1,7-disulfonic acid | 1-Amino-8-naphthol-3,6-disulfonic acid | 4-Ethylaniline | 1-Aminobenzene-3-β-chloroethylsulfone | Bluish red |
| 41 | 2-Aminonaphthalene-5-β-sulfatoethylsulfone-1,7-disulfonic acid | 1-Amino-8-naphthol-3,6-disulfonic acid | N-Ethylaniline | 1-Aminobenzene-3-β-chloroethylsulfone | Bluish red |
| 42 | 1-Aminonaphthalene-6-β-sulfatoethylsulfone-1-disulfonic acid | 1-Amino-8-naphthol-3,6-disulfonic acid | 4-Bromo-N-Methylaniline | 1-Aminobenzene-3-β-chloroethylsulfone | Bluish red |
| 43 | 1-Aminonaphthalene-6-β-sulfatoethylsulfone-1- | 1-Amino-8-naphthol-3,6-disulfonic acid | Aniline | 1-N-β-Carbamoylethylaminobenzene-3-β-sulfatoethylsulfone | Bluish red |

TABLE I-continued

| Run No. | Diazo component | Coupler | Amine | Reactive component | Color |
|---|---|---|---|---|---|
| 44 | 1-Aminonaphthalene-6-β-sulfatoethylsulfone-1-disulfonic acid | 1-Amino-8-naphthol-3,6-disulfonic acid | Aniline | 1-N-Propylaminobenzene-3-β-sulfatoethylsulfone | Bluish red |
| 45 | 1-Aminonaphthalene-6-β-sulfatoethylsulfone-1-disulfonic acid | 1-Amino-8-naphthol-3,6-disulfonic acid | Aniline | 1-N-β-Carboxyethylaminobenzene-4-β-sulfatoethylsulfone | Bluish red |
| 46 | 1-Aminobenzene-4-β-sulfatoethylsulfone-2-sulfonic acid | 1-Amino-8-naphthol-3,6-disulfonic acid | p-Chloroaniline | 1-N-β-Methoxyethylaminobenzene-3-β-sulfatoethylsulfone | Red |
| 47 | 1-Aminobenzene-4-β-sulfatoethylsulfone-2-sulfonic acid | 1-Amino-8-naphthol-3,6-disulfonic acid | Aniline | 2-Aminonaphthalene-8-β-sulfatoethylsulfone | Red |
| 48 | 1-Aminobenzene-4-β-sulfatoethylsulfone-2-sulfonic acid | 1-Amino-8-naphthol-3,6-disulfonic acid | Aniline | 2-Aminonaphthalene-5-β-sulfatoethylsulfone | Red |
| 49 | 2-Aminonaphthalene-5-β-sulfatoethylsulfone-1-disulfonic acid | 1-Amino-8-naphthol-3,6-disulfonic acid | 4-Methylaniline | 1-N-Ethylaminobenzene-3-β-sulfatoethylsulfone | Bluish red |
| 50 | 2-Aminonaphthalene-5-β-sulfatoethylsulfone-1-disulfonic acid | 1-Amino-8-naphthol-3,6-disulfonic acid | p-Chloroaniline | 1-N-Ethylaminobenzene-4-β-sulfatoethylsulfone | Bluish red |
| 51 | 2-Aminonaphthalene-6-β-sulfatoethylsulfone-1-disulfonic acid | 1-Amino-8-naphthol-4,6-disulfonic acid | 2-Methylaniline | 1-Aminobenzene-3-β-sulfatoethylsulfone | Red |
| 52 | 2-Aminonaphthalene-6-β-sulfatoethylsulfone-1-disulfonic acid | 1-Amino-8-naphthol-4,6-disulfonic acid | 2,4-Dimethylaniline | 1-Aminobenzene-3-β-sulfatoethylsulfone | Red |
| 53 | 2-Aminonaphthalene-6-β-sulfatoethylsulfone-1-disulfonic acid | 1-Amino-8-naphthol-4,6-disulfonic acid | 4-Ethylaniline | 1-Aminobenzene-3-β-sulfatoethylsulfone | Red |

EXAMPLE 3

1-Amino-8-naphthol-3,6-disulfonic acid (319.3 part) was subjected to first condensation with cyanuric chloride (184.5 parts), followed by second condensation with 1-aminobenzene-3-β-sulfatoethylsulfone (281.3 parts) whereby obtaining a monochlorotriazinyl compound of the following formula in the free acid form.

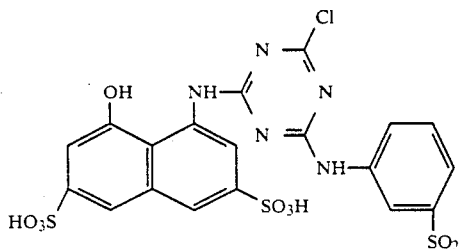

On the other hand, 1-amino-2-sulfobenzene-4-β-sulfatoethylsulfone (361.3 parts) was diazotized in a conventional manner, and the resulting diazonium compound was subjected to coupling with the monochlorotriazinyl compound obtained above, followed by condensation with nicotinic acid (123 parts). The reaction mixture was mixed with sodium chloride to precipitate crystals, which were separated on a filter.

There was obtained a monoazo compound represented by the following formula in the free acid form.

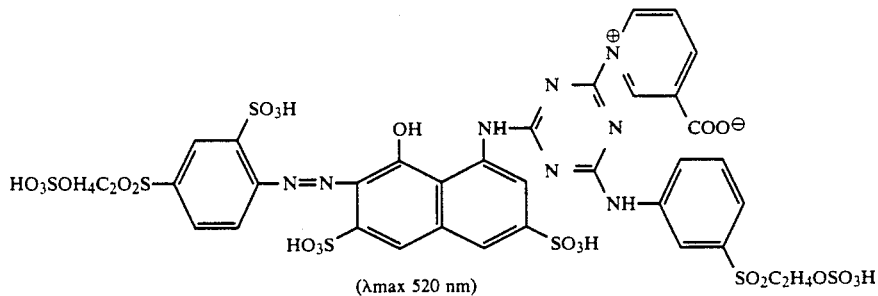

(λmax 520 nm)

EXAMPLE 4

Example 3 was repeated, provided that the following diazo component, coupler, pyridine compound and reactive component shown in 2nd, 3rd, 4th and 5th columns of the following Table II, respectively, were used in place of 1-amino-2-sulfobenzene-4-β-sulfatoethylsulfone, 1-amino-8-naphthol-3,6-disulfonic acid, nicotinic acid and 1-aminobenzene-3-β-sulfatoethylsulfone, respectively, thereby obtaining the corresponding monoazo compound, which showed the color shown in 6th column of the following Table II on the dyeing of cellulose fiber materials.

TABLE II

| 1 Run No. | 2 Diazo component | 3 Coupler | 4 Pyridine compound | 5 Reactive component | 6 Color |
|---|---|---|---|---|---|
| 1 | 1-Amino-2-sulfobenzene-4-β-sulfatoethylsulfone | 1-Amino-8-naphthol-3,6-disulfonic acid | Nicotinic acid | 1-Aminobenzene-3-vinylsulfone | Red |
| 2 | 1-Amino-2-sulfobenzene-4-β-sulfatoethylsulfone | 1-Amino-8-naphthol-3,6-disulfonic acid | Isonicotinic acid | 1-Aminobenzene-4-β-sulfatoethylsulfone | Red |
| 3 | 1-Amino-2-sulfobenzene-4-β-sulfatoethylsulfone | 1-Amino-8-naphthol-3,6-disulfonic acid | Nicotinamide | 1-Aminobenzene-4-β-sulfatoethylsulfone | Red |
| 4 | 1-Amino-2-sulfobenzene-4-β-sulfatoethylsulfone | 1-Amino-8-naphthol-3,6-disulfonic acid | 3-Sulfopyridine | 1-Aminobenzene-3-β-sulfatoethylsulfone | Red |
| 5 | 1-Amino-2-sulfobenzene-4-β-sulfatoethylsulfone | 1-Amino-8-naphthol-3,6-disulfonic acid | 4-β-Hydroxyethylpyridine | 1-Aminobenzene-3-β-sulfatoethylsulfone | Red |
| 6 | 1-Amino-2-sulfobenzene-4-β-sulfatoethylsulfone | 1-Amino-8-naphthol-3,6-disulfonic acid | Nicotinic acid | 1-Aminonaphthalene-6-β-sulfatoethylsulfone-1-sulfonic acid | Red |
| 7 | 1-Amino-2-sulfobenzene-4-β-sulfatoethylsulfone | 1-Amino-8-naphthol-3,6-disulfonic acid | 4-β-Sulfoethylpyridine | 1-Ethylaminobenzene-4-β-sulfatoethylsulfone | Red |
| 8 | 1-Amino-2-sulfobenzene-4-β-sulfatoethylsulfone | 1-Amino-8-naphthol-3,6-disulfonic acid | Nicotinic acid | 1-Amino-2-sulfobenzene-4-β-sulfatoethylsulfone | Red |
| 9 | 1-Amino-2-sulfobenzene-4-β-sulfatoethylsulfone | 1-Amino-8-naphthol-3,6-disulfonic acid | Pyridine | 1-Amino-2-sulfobenzene-4-β-sulfatoethylsulfone | Red |
| 10 | 1-Amino-2-sulfobenzene-4-β-sulfatoethylsulfone | 1-Amino-8-naphthol-3,6-disulfonic acid | Nicotinic acid | 2-Aminonaphthalene-8-β-sulfatoethylsulfone-6-sulfonic acid | Red |
| 11 | 1-Amino-2-sulfobenzene-4-β-sulfatoethylsulfone | 1-Amino-8-naphthol-4,6-disulfonic acid | 4-Chloropyridine | 2-Aminonaphthalene-5-β-sulfatoethylsulfone-1-sulfonic acid | Yellowish red |
| 12 | 1-Amino-2-sulfobenzene-4-β-sulfatoethylsulfone | 1-Amino-8-naphthol-4,6-disulfonic acid | 3-Methylpyridine | 1-Amino-2-methoxybenzene-5-β-phosphatoethylsulfone | Yellowish red |
| 13 | 1-Amino-2-sulfobenzene-5-β-sulfatoethylsulfone | 1-Amino-8-naphthol-3,6-disulfonic acid | Nicotinic acid | 1-Aminobenzene-3-β-sulfatoethylsulfone | Yellowish red |
| 14 | 1-Amino-2-sulfobenzene-5-β- | 1-Amino-8-naphthol-3,6- | Isonicotinamide | 2-Aminonaphthalene-6-β-sulfato- | Yellowish red |

TABLE II-continued

| Run No. | Diazo component | Coupler | Pyridine compound | Reactive component | Color |
|---|---|---|---|---|---|
| | sulfatoethyl-sulfone | disulfonic acid | | ethylsulfone-1-sulfonic acid | |
| 15 | 2-Aminonaphthalene-5-β-sulfatoethyl-sulfone-1-sulfonic acid | 1-Amino-8-naphthol-3,6-disulfonic acid | Nicotinic acid | 2-Aminonaphthalene-6-β-sulfatoethylsulfone-1-sulfonic acid | Bluish red |
| 16 | 2-Aminonaphthalene-5-β-sulfatoethyl-sulfone-1-sulfonic acid | 1-Amino-8-naphthol-3,6-disulfonic acid | Nicotinic acid | 1-Aminobenzene-3-β-sulfatoethyl-sulfone | Bluish red |
| 17 | 2-Aminonaphthalene-5-β-sulfatoethyl-sulfone-1-sulfonic acid | 1-Amino-8-naphthol-3,6-disulfonic acid | Isonicotinic acid | 1-Ethylamino-benzene-3-β-sulfatoethyl-sulfone | Bluish red |
| 18 | 2-Aminonaphthalene-5-β-sulfatoethyl-sulfone-1-sulfonic acid | 1-Amino-8-naphthol-3,6-disulfonic acid | Isonicotinic acid | 1-Amino-2-methoxy-5-methylbenzene-4-β-sulfatoethyl-sulfone | Bluish red |
| 19 | 2-Aminonaphthalene-6-β-sulfatoethyl-sulfone-1-sulfonic acid | 1-Amino-8-naphthol-3,6-disulfonic acid | Nicotinic acid | 1-Aminobenzene-3-β-sulfatoethyl-sulfone | Bluish red |
| 20 | 2-Aminonaphthalene-6-β-sulfatoethyl-sulfone-1-sulfonic acid | 1-Amino-8-naphthol-3,6-disulfonic acid | Nicotinamide | 1-Aminobenzene-3-β-sulfatoethyl-sulfone | Bluish red |
| 21 | 2-Aminonaphthalene-6-β-sulfatoethyl-sulfone-1-sulfonic acid | 1-Amino-8-naphthol-3,6-disulfonic acid | Nicotinic acid | 2-Aminonaphthalene-6-β-sulfatoethylsulfone-1-sulfonic acid | Bluish red |
| 22 | 2-Aminonaphthalene-6-β-sulfatoethyl-sulfone-1-sulfonic acid | 1-Amino-8-naphthol-3,6-disulfonic acid | 4-β-Sulfoethyl-pyridine | 2-Aminonaphthalene-6-β-sulfatoethylsulfone-1-sulfonic acid | Bluish red |
| 23 | 2-Aminonaphthalene-6-β-sulfatoethyl-sulfone-1-sulfonic acid | 1-Amino-8-naphthol-3,6-disulfonic acid | 4-Chloropyridine | 1-Amino-2-chloro-benzene-5-β-sulfatoethyl-sulfone | Bluish red |
| 24 | 2-Aminonaphthalene-6-β-sulfatoethyl-sulfone-1-sulfonic acid | 1-Amino-8-naphthol-4,6-disulfonic acid | 3-Ethylpyridine | 1-Amino-2-ethoxy-benzene-5-β-sulfatoethyl-sulfone | Bluish red |
| 25 | 1-Amino-2-sulfobenzene-4,5-bis(β-sulfatoethyl-sulfone) | 1-Amino-8-naphthol-4,6-disulfonic acid | Nicotinic acid | 1-Amino-2-ethoxy-benzene-5-β-sulfatoethyl-sulfone | Bluish red |
| 26 | 2-Aminonaphthalene-5-β-sulfatoethyl-sulfone-1-sulfonic acid | 1-Amino-8-naphthol-3,6-disulfonic acid | Nicotinic acid | 1-Aminobenzene-4-β-sulfatoethyl-sulfone | Bluish red |
| 27 | 2-Aminonaphthalene-5-β-sulfatoethyl-sulfone-1-sulfonic acid | 1-Amino-8-naphthol-3,6-disulfonic acid | Nicotinic acid | 1-N-Ethylamino-benzene-4-β-sulfatoethyl-sulfone | Bluish red |
| 28 | 2-Aminonaphthalene-6-β-sulfato-ethylsulfone-1-sulfonic acid | 1-Amino-8-naphthol-3,6-disulfonic acid | Nicotinic acid | 1-Aminobenzene-4-β-sulfatoethyl-sulfone | Bluish red |
| 29 | 2-Aminonaphthalene-6-β-sulfato-ethylsulfone-1-sulfonic acid | 1-Amino-8-naphthol-3,6-disulfonic acid | Nicotinic acid | 1-N-Ethylamino-benzene-3-β-sulfatoethylsulfone | Bluish red |
| 30 | 2-Aminonaphthalene-6-β-sulfato-ethylsulfone-1-sulfonic acid | 1-Amino-8-naphthol-3,6-disulfonic acid | Nicotinic acid | 1-N-Ethylamino-benzene-4-β-sulfatoethyl-sulfone | Bluish red |
| 31 | 2-Aminonaphtha- | 1-Amino-8- | Nicotinic acid | 1-Aminobenzene- | Bluish |

TABLE II-continued

| Run No. | Diazo component | Coupler | Pyridine compound | Reactive component | Color |
|---|---|---|---|---|---|
| | lene-6-β-sulfatoethyl-sulfone-1-sulfonic acid | naphthol-4,6-disulfonic acid | | 3-β-sulfatoethyl-sulfone | red |
| 32 | 2-Aminonaphthalene-6-β-sulfatoethyl-sulfone-1-sulfonic acid | 1-Amino-8-naphthol-4,6-disulfonic acid | Nicotinic acid | 1-Aminobenzene-4-β-sulfatoethyl-sulfone | Bluish red |
| 33 | 2-Aminonaphthalene-6-β-sulfatoethyl-sulfone-1-sulfonic acid | 1-Amino-8-naphthol-4,6-disulfonic acid | Nicotinic acid | 1-N-Ethylamino-sulfatoethyl-sulfatoethyl-sulfone | Bluish red |
| 34 | 2-Aminonaphthalene-6-β-sulfatoethyl-sulfone-1-sulfonic acid | 1-Amino-8-naphthol-4,6-disulfonic acid | Nicotinic acid | 1-N-Ethylamino-benzene-4-β-sulfatoethyl-sulfone | Bluish red |
| 35 | 2-Aminonaphthalene-6-β-sulfatoethyl-sulfone-1-sulfonic acid | 1-Amino-8-naphthol-4,6-disulfonic acid | Nicotinic acid | 2-Aminonaphthalene-6-β-sulfato-ethylsulfone-1-sulfonic acid | Bluish red |
| 36 | 2-Aminonaphthalene-5-β-sulfatoethyl-sulfone-1,7-disulfonic acid | 1-Amino-8-naphthol-3,6-disulfonic acid | Nicotinic acid | 1-Aminobenzene-3-β-sulfatoethyl-sulfone | Bluish red |
| 37 | 2-Aminonaphthalene-5-β-sulfatoethyl-sulfone-1,7-disulfonic acid | 1-Amino-8-naphthol-3,6-disulfonic acid | Nicotinic acid | 1-Aminobenzene-4-β-sulfatoethyl-sulfone | Bluish red |
| 38 | 2-Aminonaphthalene-6-β-sulfatoethyl-sulfone-1-sulfonic acid | 1-Amino-8-naphthol-3,6-disulfonic acid | Nicotinic acid | 1-N-Propylamino-benzene-3-β-sulfatoethyl-sulfone | Bluish red |
| 39 | 2-Aminonaphthalene-6-β-sulfatoethyl-sulfone-1-sulfonic acid | 1-Amino-8-naphthol-3,6-disulfonic acid | Nicotinic acid | 1-Aminobenzene-3-β-chloroethyl-sulfone | Bluish red |
| 40 | 2-Aminonaphthalene-6-β-sulfatoethyl-sulfone-1-sulfonic acid | 1-Amino-8-naphthol-3,6-disulfonic acid. | Nicotinic acid | 2-Aminonaphthalene-8-β-sulfato-ethylsulfone | Bluish red |
| 41 | 1-Aminonaphthalene-6-β-sulfatoethyl-sulfone-1-sulfonic acid | 1-Amino-8-naphthol-4,6-disulfonic acid | Nicotinic acid | 1-N-β-Hydroxy-ethylaminobenzene-3-β-sulfatoethyl-sulfone | Red |
| 42 | 1-Aminonaphthalene-6-β-sulfatoethyl-sulfone-1-sulfonic acid | 1-Amino-8-naphthol-4,6-disulfonic acid | Nicotinic acid | 2-Aminonaphthalene-5-β-sulfato-ethylsulfone | Red |
| 43 | 1-Aminonaphthalene-6-β-sulfatoethyl-sulfone-1-sulfonic acid | 1-Amino-8-naphthol-3,6-disulfonic acid | Nicotinic acid | 1-N-β-Carbamoyl-ethylaminobenzene-3-β-sulfatoethyl-sulfone | Bluish red |
| 44 | 1-Aminonaphthalene-6-β-sulfatoethyl-sulfone-1-sulfonic acid | 1-Amino-8-naphthol-3,6-disulfonic acid | Nicotinic acid | 1-N-β-Carboxy-ethylaminobenzene-4-β-sulfatoethyl-sulfone | Bluish red |
| 45 | 1-Aminonaphthalene-6-β-sulfatoethyl-sulfone-1-sulfonic acid | 1-Amino-8-naphthol-3,6-disulfonic acid | Nicotinic acid | 1-N-Methoxyethyl-aminobenzene-3-β-sulfatoethyl-sulfone | Bluish red |
| 46 | 2-Aminonaphthalene-6-β-sulfatoethyl-sulfone-1-sulfonic acid | 1-Amino-8-naphthol-3,6-disulfonic acid | Nicotinic acid | 1-Amino-2-methoxy-5-methylbenzene-4-β-sulfatoethyl-sulfone | Bluish red |

TABLE II-continued

| Run No. | Diazo component | Coupler | Pyridine compound | Reactive component | Color |
|---|---|---|---|---|---|
| 47 | 2-Aminonaphthalene-6-β-sulfatoethylsulfone-1-sulfonic acid | 1-Amino-8-naphthol-3,6-disulfonic acid | Nicotinic acid | 1-Aminobenzene-4-vinylsulfone | Bluish red |
| 48 | 2-Aminonaphthalene-5-β-sulfatoethylsulfone-1-sulfonic acid | 1-Amino-8-naphthol-3,6-disulfonic acid | Nicotinic acid | 1-Aminobenzene-4-vinylsulfone | Bluish red |
| 49 | 2-Aminonaphthalene-5-β-sulfatoethylsulfone-1-sulfonic acid | 1-Amino-8-naphthol-3,6-disulfonic acid | Nicotinic acid | 1-Amino-4-methoxybenzene-3-β-sulfatoethylsulfone | Bluish red |
| 50 | 2-Aminonaphthalene-6-vinylsulfone-1-sulfonic acid | 1-Amino-8-naphthol-3,6-disulfonic acid | Nicotinic acid | 1-Aminobenzene 4-β-sulfatoethylsulfone | Bluish red |

DYEING EXAMPLE 1

Each of the monoazo compounds obtained in Examples 1 and 3 (0.3 part) was dissolved in water (200 parts), and sodium sulfate (20 parts) and cotton (10 parts) were added thereto. The bath was heated to 50° C. Thirty minutes thereafter, sodium carbonate (4 parts) was added thereto. Dyeing was continued for 1 hour at the temperature. Thereafter, the cotton was washed with water and soaped to obtain each dyed product of a deep red excellent in fastness properties, particularly those such as chlorine fastness, light fastness and perspiration fastness with excellent build-up property.

DYEING EXAMPLE 2

Each of the monoazo compounds obtained in Examples 1 to 4 (0.3 part) was dissolved in water (300 parts), and sodium sulfate (30 parts) and cotton (10 parts) were added thereto. The bath was heated to 60° C. Twenty minutes thereafter, sodium carbonate (5 parts) were added thereto. Dyeing was continued for 1 hour at that temperature. Thereafter, the cotton was washed with water and soaped to obtain each dyed product of a deep red color excellent in fastness properties, particularly those such as chlorine fastness, light fastness and perspiration fastness with excellent build-up property.

DYEING EXAMPLE 3

| Preparation of dye paste: | |
|---|---|
| Each of the monoazo compounds obtained in Examples 1 to 4 | 5 parts |
| Urea | 5 parts |
| Sodium alginate (50%) stock paste | 50 parts |
| Hot water | 25 parts |
| Sodium hydrogencarbonate | 2 parts |
| Balance (water) | 13 parts |

Mercerized cotton broad was printed with the dye paste having the above composition, and the printed broad was pre-dried, steamed at 100° C. for 5 minutes, washed with hot water, soaped, again washed with water and dried.

Thus, there was obtained each printed product of a red color excellent in fastness properties, particularly those such as chlorine fastness, light fastness and perspiration-light fastness with excellent build-up property.

DYEING EXAMPLE 4

Each of the monoazo compounds obtained in Example 1 to 4 (25 parts) was dissolved in hot water, and the solution was cooled to 25° C. Aqueous 32.5% sodium hydroxide solution (5.5 parts) and 50° Be' water glass (150 parts) were thereto, and water was added thereto to make the solution 1,000 parts at 25° C. Immediately thereafter, cotton cloth was padded with the solution, batched up, wrapped tightly with a polyethylene film and allowed to stand in a room of 20° C. for 20 hours.

On the other hand, a cotton cloth wrapped tightly with a polyethylene film, which was prepared in the same manner as above was allowed to stand in a room of 5° C. for 20 hours.

Thereafter, the respective padded cloths were washed with cold water and then hot water, boil-soaped with a detergent, then washed with cold water and then dried.

There was observed almost no difference in their color shade and depth between the dyed products obtained by standing at 5° C. and 20° C. each for 20 hours. In this cold batch-up dyeing method, each of the monoazo compounds was found to have excellent build-up property.

DYEING EXAMPLE 5

Each of the monoazo compounds obtained in Examples 1 to 4 (25 parts) was dissolved in hot water, and the solution was cooled to 25° C. Aqueous 32.5% sodium hydroxide solution (10 parts) and anhydrous sodium sulfate (30 parts) were added thereto, and water was added thereto to make the solution 1000 parts at 25° C. Immediately thereafter, using the solution as a padding liquor, viscose rayon woven fabric was subjected to padding, and the padded fabric was batched-up, wrapped tightly with a polyethylene film and allowed to stand in a room of 20° C. for 20 hours.

On the other hand, a viscose rayon woven fabric wrapped tightly with a polyethylene film, which was prepared in the same manner as above, was allowed to stand in a room of 5° C. for 20 hours.

Thereafter, the respective fabrics were washed with cold water and then hot water, boil-soaped with a detergent, washed with cold water and then dried.

There was observed almost no difference in their color shade and depth between the dyed products obtained by standing at 5° C. and 20° C. each for 20 hours.

DYEING EXAMPLE 6

Dyeing Example 2 was repeated, provided that the amount of sodium carbonate was changed from 5 parts to 3 parts, whereby the respective monoazo compounds gave the dyed products similar to those obtained in Dyeing Example 2.

DYEING EXAMPLE 7

Dyeing Example 2 was repeated, provided that the dyeing was carried out at 50° C. in place of 60° C., whereby the respective monoazo compounds gave the dyed products similar to those obtained in Dyeing Example 2. The dyeing carried out at 70° C. also gave similar results.

DYEING EXAMPLE 8

Dyeing Example 2 was repeated, provided that the amount of sodium sulfate was changed from 30 parts to 15 parts, whereby the respective monoazo compounds gave the dyed products similar to those obtained in Dyeing Example 2.

We claim:

1. A monoazo compound represented by the following formula (I) in the free acid form,

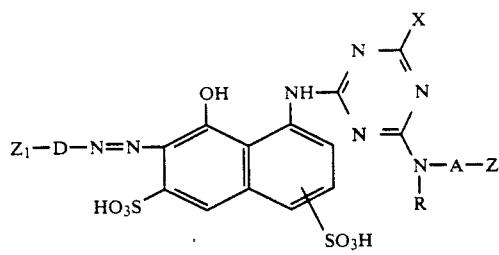

wherein D is phenylene which is unsubstituted or substituted once, twice or three times by methyl, ethyl, methoxy, ethoxy, halogeno, acetylamino, propionylamino, nitro, sulfo, carboxy, vinylsulfonyl or β-sulfatoethylsulfonyl, or naphthylene which is unsubstituted or substituted once or twice by sulfo, vinylsulfonyl or β-sulfatoethylsulfonyl;

R is hydrogen or alkyl which is unsubstituted or substituted by hydroxy, cyano, alkoxy having 1 to 4 carbon atoms, halogeno, carboxy, carbamoyl, $C_1$-$C_4$ alkoxycarbonyl, $C_1$-$C_4$ alkylcarbonyloxy, sulfo or sulfamoyl;

A is phenylene which is unsubstituted or substituted once or twice by methyl, ethyl, methoxy, ethoxy, sulfo, carboxy or halogen, or is napthylene unsubstituted or substituted by sulfo;

$Z_1$ and $Z_2$ independently of one another are each —$SO_2CH=CH_2$ or —$SO_2CH_2CH_2Y$ in which Y is a group capable of being split by the action of an alkali; and X is pyridinio which is unsubstituted or substituted by carboxy or carbamoyl, or is amino of the following formula (II):

in which any one of $R_1$ and $R_2$ is methyl or ethyl, and the other is phenyl which is unsubstituted or substituted once or twice by alkyl having 1 to 4 carbon atoms, sulfo, carboxy, halogeno or alkoxy having 1 to 4 carbon atoms, or any one of $R_1$ and $R_2$ is hydrogen, and the other is phenyl or mono- or di-sulfophenyl, the phenyl and sulfophenyl being unsubstituted or substituted by alkyl having 1 to 4 carbon atoms, carboxy or halogeno, with the proviso that $Z_1$ is located at m- or p-position to the azo group when D is phenylene.

2. The compound according to claim 1, wherein X is amino represented by the formula (II).

3. The compound according to claim 2, wherein any one of $R_1$ and $R_2$ in the formula (II) is methyl or ethyl, and the other is phenyl unsubstituted or substituted by alkyl having 1 to 4 carbon atoms, alkoxy having 1 to 4 carbon atoms, sulfo, carboxy or halogeno.

4. The compound according to claim 2, wherein any one of $R_1$ and $R_2$ in the formula (II) is hydrogen, and the other is phenyl or mono-or di-sulfophenyl, the phenyl and sulfophenyl being unsubstituted or substituted by alkyl having 1 to 4 carbon atoms, carboxy or halogeno.

5. The compound according to claim 1, wherein X is pyridinio which is unsubstituted or substituted by carboxy or carbamoyl.

6. The compound according to claim 1, wherein D is

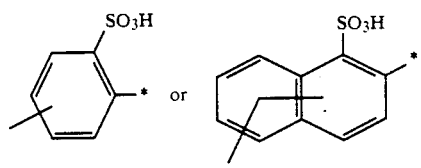

in which the linkage asterisked bonds to the azo group.

7. The compound according to claim 1, which is represented by the following formula (IV) in the free acid form,

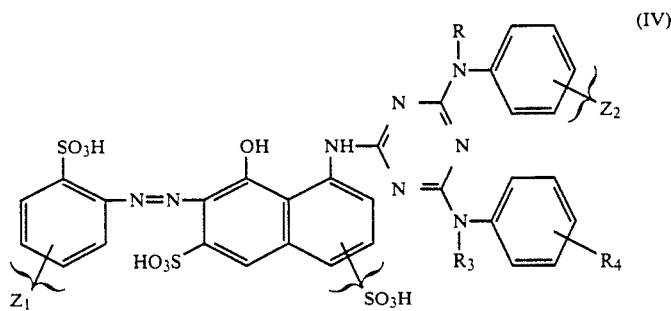

wherein R, $Z_1$ and $Z_2$ are as defined in claim 1, $R_3$ is hydrogen, methyl or ethyl, and $R_4$ is hydrogen, methyl, ethyl, sulfo or chloro.

8. The compound according to claim 1, which is represented by the following formula (V) in the free acid form,

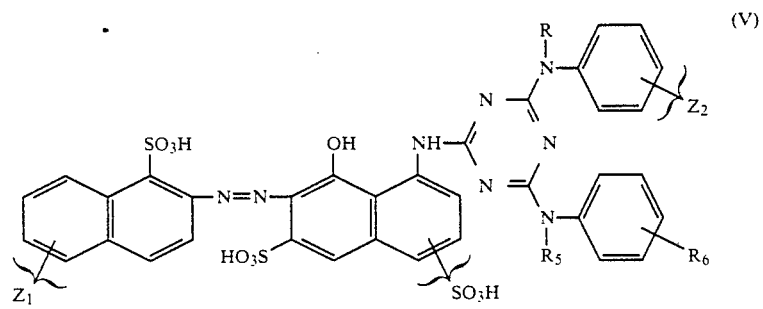

wherein R, $Z_1$ and $Z_2$ are as defined in claim 1, $R_5$ is hydrogen, methyl or ethyl, and $R_6$ is hydrogen, methyl, ethyl, sulfo or chloro.

9. The compound according to claim 1, which is represented by the following formula (VI) in the free acid form, wherein R, $Z_1$ and $Z_2$ are as defined in claim 1, and $R_7$ is hydrogen, carboxy or carbamoyl.

10. The compound according to claim 1, wherein $Z_1$ and $Z_2$ independently of one another are each vinylsulfonyl or $\beta$-sulfatoethylsulfonyl.

11. The compound according to claim 1, wherein R is hydrogen, methyl or ethyl.

12. The compound according to claim 8, which is represented by the following formula in the free acid form,

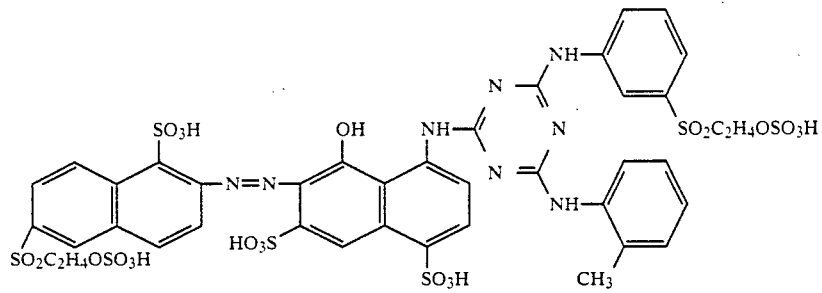

13. The compound according to claim 8, which is represented by the following formula in the free acid form,

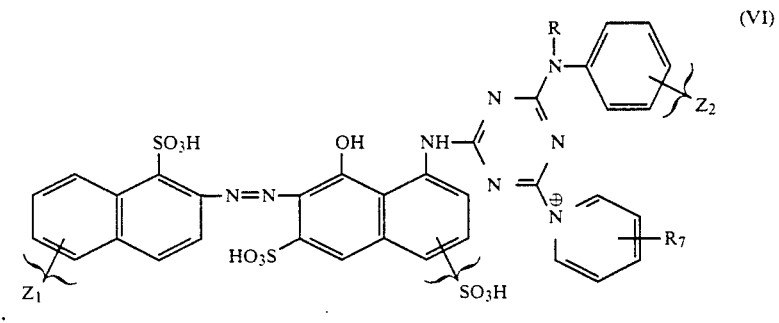

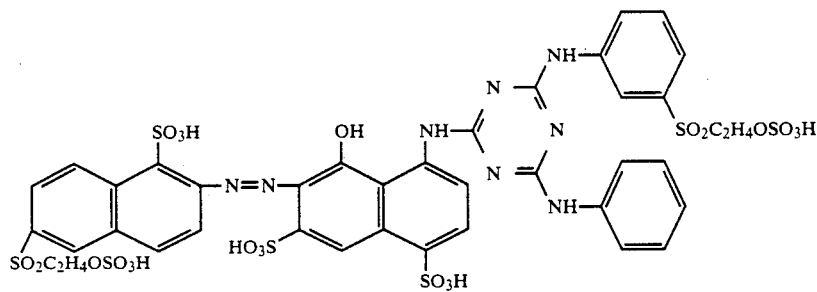
14. The compound according to claim 4, which is represented by the following formula in the free acid form,
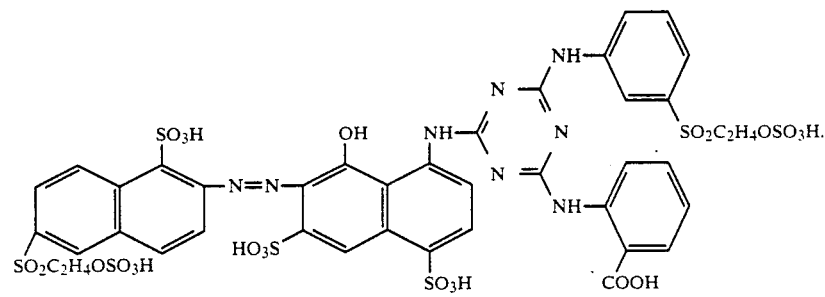
* * * * *